US009256842B2

(12) United States Patent
Leggett et al.

(10) Patent No.: US 9,256,842 B2
(45) Date of Patent: Feb. 9, 2016

(54) DETERMINING FUEL ECONOMY BY FUEL SOURCE LOCATION

(75) Inventors: Jacquelle D. Leggett, Raleigh, NC (US); Philippa M. Rhodes, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 449 days.

(21) Appl. No.: 13/534,913

(22) Filed: Jun. 27, 2012

(65) Prior Publication Data

US 2014/0005917 A1    Jan. 2, 2014

(51) Int. Cl.
  *G06F 7/70*   (2006.01)
  *G06Q 10/00*  (2012.01)
  *B60R 16/023* (2006.01)

(52) U.S. Cl.
  CPC ............ *G06Q 10/00* (2013.01); *B60R 16/0236* (2013.01)

(58) Field of Classification Search
  CPC .......................... G06Q 10/00; B60R 16/0236
  USPC ......................................................... 701/123
  See application file for complete search history.

(56) References Cited

U.S. PATENT DOCUMENTS

| 6,594,579 | B1  |   | 7/2003  | Lowrey et al. |
|-----------|-----|---|---------|---------------|
| 7,219,539 | B1  | * | 5/2007  | Bauerle ...................... 73/114.54 |
| 7,225,787 | B2  | * | 6/2007  | Bromberg ............... F02B 47/04 123/198 A |
| 8,260,534 | B2  | * | 9/2012  | Henderson et al. ........... 701/123 |
| 8,296,048 | B2  | * | 10/2012 | Henderson et al. ........... 701/123 |
| 8,315,788 | B2  | * | 11/2012 | Surnilla et al. ................ 701/123 |
| 8,463,521 | B2  | * | 6/2013  | Westendorf ........... B60W 30/16 340/439 |
| 2008/0255755 | A1 | * | 10/2008 | Chen ............................. 701/123 |
| 2009/0099724 | A1 |   | 4/2009  | Kranz et al. |
| 2009/0109022 | A1 | * | 4/2009  | Gangopadhyay et al. ..... 340/540 |
| 2009/0204316 | A1 | * | 8/2009  | Klampfl et al. ............... 701/123 |
| 2009/0306997 | A1 |   | 12/2009 | Betancourt |
| 2009/0326753 | A1 | * | 12/2009 | Chen et al. ....................... 701/29 |
| 2010/0063717 | A1 | * | 3/2010  | Proefke et al. ................. 701/123 |
| 2010/0148952 | A1 | * | 6/2010  | Barajas ................... B60R 25/00 340/450.2 |
| 2010/0250059 | A1 | * | 9/2010  | Sekiyama ........... B60R 16/0236 701/33.4 |
| 2011/0054768 | A1 |   | 3/2011  | Sullivan |
| 2011/0112717 | A1 |   | 5/2011  | Resner |
| 2011/0153178 | A1 | * | 6/2011  | Westendorf ........... B60W 30/16 701/96 |
| 2011/0160992 | A1 | * | 6/2011  | Crombez ..................... 701/123 |
| 2011/0166773 | A1 |   | 7/2011  | Raz et al. |
| 2011/0196600 | A1 | * | 8/2011  | Henderson et al. ........... 701/123 |
| 2011/0224894 | A1 | * | 9/2011  | Henderson ............ B60K 35/00 701/123 |
| 2011/0246010 | A1 | * | 10/2011 | de la Torre Bueno ... B60K 6/46 701/22 |
| 2011/0274998 | A1 | * | 11/2011 | Ichikawa .......... H01M 8/04388 429/446 |
| 2012/0042716 | A1 | * | 2/2012  | Watson .................. B60K 35/00 73/114.54 |

(Continued)

OTHER PUBLICATIONS

"Fuel Selection Optimizer", IP.com, IP.com No. IPCOM000158849D, Oct. 2, 2007, published on the world wide web at: http://ip.com/IPCOM/000158849.

(Continued)

*Primary Examiner* — Tuan C. To
(74) *Attorney, Agent, or Firm* — Paul S. Drake (57) ABSTRACT

A method, system or computer usable program product for computing fuel economy for a vehicle by fuel source location including monitoring a fuel level for the vehicle, responsive to determining a first increase of the fuel level at a first fuel source location, computing a first fuel economy based on the first increase of the fuel level and a first distance travelled by the vehicle since a previous fuel source location, and allocating the first fuel economy to the previous fuel source location in a database.

20 Claims, 7 Drawing Sheets (56) References Cited

U.S. PATENT DOCUMENTS

2012/0123665 A1* 5/2012 Greenberg ............... C12P 7/06
 701/110
2014/0163865 A1* 6/2014 Mineta ......................... 701/409

OTHER PUBLICATIONS

"System for Increasing Vehicular Fuel Efficiency using Predictive Adjustment Techniques", IP.com, IP.com No. IPCOM000174147D, Aug. 27, 2008, published on the world wide web at: http://ip.com/IPCOM/000174147.

"Enhanced Mileage Calculations with GPS Assistance", IP.com, IP.com No. IPCOM000211823D, Oct. 19, 2011, published on the world wide web at: http://ip.com/IPCOM/000211823.

"Using Fuelly to Track Your Gas Mileage", getrichslowly.org, Jun. 9, 2009, published on the world wide web at: http://www.getrichslowly.org/blog/2009/06/09/fuelly-2/.

"Use Fuelly to Track Your Gas Mileage", getrichslowly.org, Aug. 8, 2008, published on the world wide web at: http://www.getrichslowly.org/blog/2008/08/08/use-fuelly-to-track-your-fuel-economy/.

"Which Gas Station Has the Best Gas Mileage", Wiki Answers, Nov. 22, 2009, published on the world wide web at: http://web.archive.org/web/20091122011719/http://wiki.answers.com/Q/Which_gas_station_has_the_best_gas_mileage.

"Welcome to Fuelly", Fuelly.com, Jul. 18, 2009, published on the world wide web at: http://web.archive.org/web/20090718153041/http://www.fuelly.com//.

"Free Gas Mileage Tracking Software", Duck Software, Jan. 5, 2011, published on the world wide web at: http://web.archive.org/web/20110105032939/http://www.ducksoftware.com/gasmileagetracker.html.

"Fuel Consumption Reduction", Tracking System Direct, May 4, 2011, published on the world wide web at: http://web.archive.org/web/20110504221854/http://www.tracking-system.com/for-businesses/fuel-consumption-reduction.html.

* cited by examiner

| | |
|---|---|
| Fuel Source Location | 801 |
| Distance | 802 |
| Fuel Amount | 804 |
| Octane | 806 |
| Average Fuel Temp | 808 |
| Average RPM | 810 |
| Average Speed | 812 |
| Rain Distance | 814 |
| Driver | 816 |
| Total Δ V | 818 |
| Total Δ A | 820 |
| Average Tire Pressure | 822 |
| Average Ambient Temp | 824 |
| Fuel Economy | 826 |
| Adj. Fuel Economy | 828 |

| Location | Fuel Economy | Adj. Fuel Econ. | Validity | Rank |
|---|---|---|---|---|
| S1 | 18 | 20 | 4 | 3 |
| S2 | 20 | 22 | 5 | 1 |
| S3 | 22 | 21 | 3 | 2 |
| ⋮ | ⋮ | ⋮ | ⋮ | ⋮ |

855  860  865  870  875

DETERMINING FUEL ECONOMY BY FUEL SOURCE LOCATION

BACKGROUND

1. Technical Field

The present invention relates generally to determining fuel economy, and in particular, to a computer implemented method for determining fuel economy by fuel source location.

2. Description of Related Art

There are many sources of costs for operating a vehicle. In addition to the purchase price of a vehicle, there is the cost of operation including maintenance, repairs, and the cost of consumables such as oil, gas, diesel, transmission fluid, windshield washer fluid, oil filters, tires, etc. The most costly consumable is the fuel, which over the lifetime of a vehicle may be greater than the original purchase price of that vehicle.

As the price of fuel increases, demand for increased fuel economy also increases. This applies not only to individuals, but to companies and other entities with fleets of vehicles. As a result, the fuel economy of many vehicles has been rising recently due to this demand and to governmental requirements of increased fuel economy. In addition, some people have been changing their vehicle maintenance and driving habits to increase their fuel economy. For example, a vehicle with properly inflated tires may be up to several percent more fuel efficient than the same vehicle with improperly inflated tires.

SUMMARY

The illustrative embodiments provide a method, system, and computer usable program product for computing fuel economy for a vehicle by fuel source location including monitoring a fuel level for the vehicle, responsive to determining a first increase of the fuel level at a first fuel source location, computing a first fuel economy based on the first increase of the fuel level and a first distance travelled by the vehicle since a previous fuel source location, and allocating the first fuel economy to the previous fuel source location in a database.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Steps may be taken to determine fuel economy for a vehicle by fuel source location. These steps may be taken as will be explained with reference to the various embodiments below.

Figure 1:
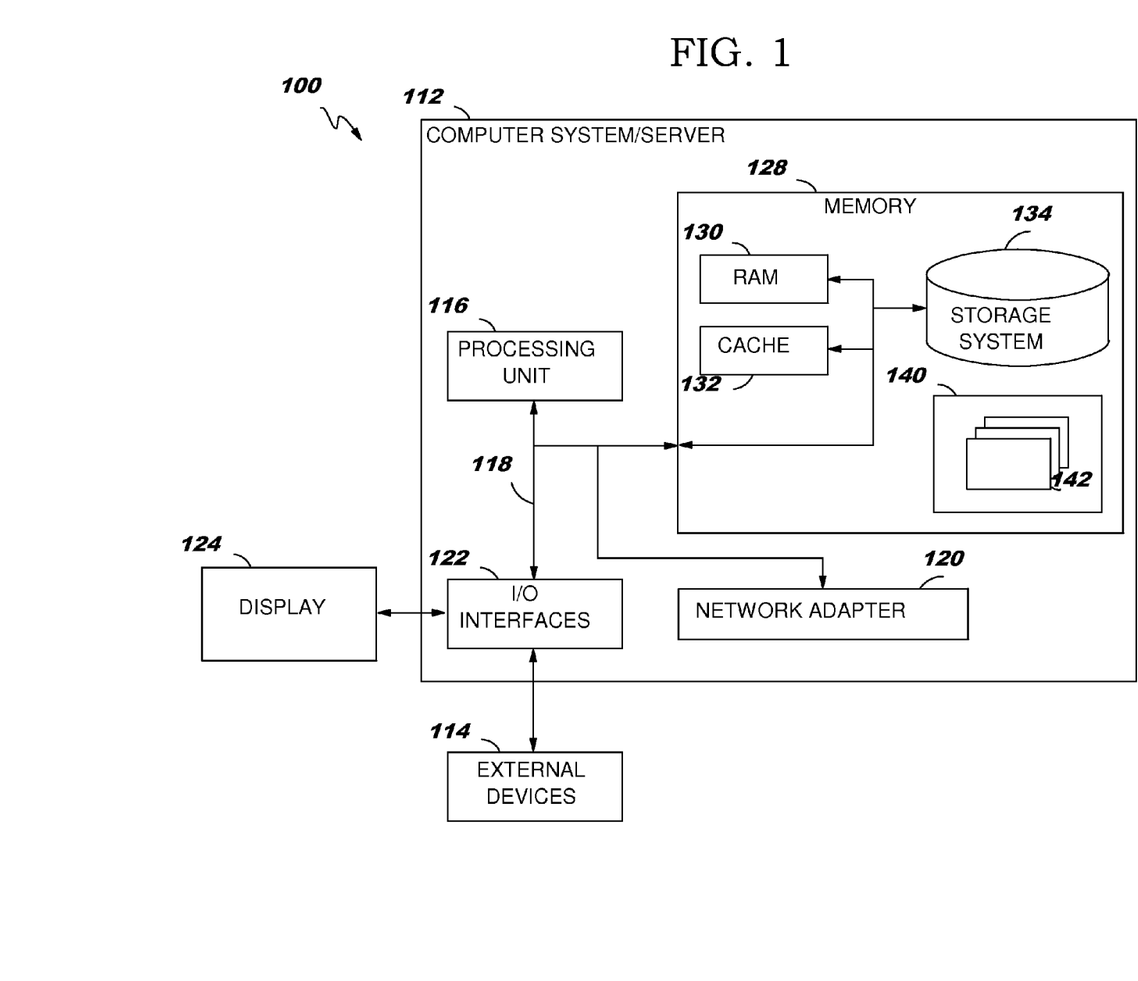
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for determining fuel economy for a vehicle by fuel source location.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
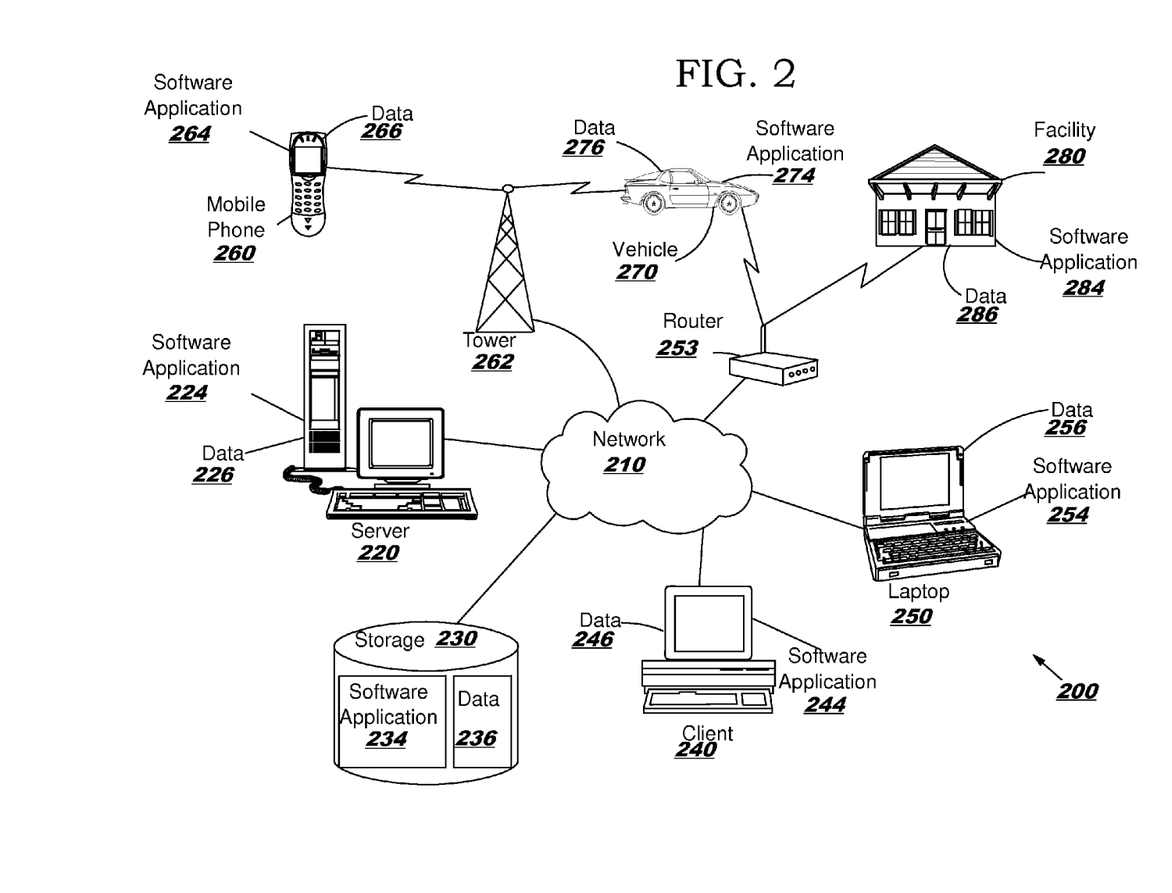
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, vehicle 270 (such as an automobile or truck), and facility 280 (such as a home or business) are coupled to network 210 including wirelessly such as through a network router 253. A mobile phone 260 and vehicle 270 may be coupled to network 210 through a mobile phone tower 262. Data processing systems, such as server 220, client 240, laptop 250, mobile phone 260, facility 280 and vehicle 290 contain data and have software applications including software tools executing thereon. Other types of data processing systems such as personal digital assistants (PDAs), smartphones, tablets and netbooks may be coupled to network 210.

Server 220 may include software application 224 and data 226 for determining fuel economy for a vehicle by fuel source location or other software applications and data in accordance with embodiments described herein. Storage 230 may contain software application 234 and a content source such as data 236 for generating and utilizing a database of historical fuel economy information by fuel source location. Other software and content may be stored on storage 230 for sharing among various computer or other data processing devices. Client 240 may include software application 244 and data 246. Laptop 250 and mobile phone 260 may also include software applications 254 and 264 and data 256 and 266. Vehicle 270 may include software applications 274 and data 276. Facility 280 may include software applications 284 and data 286. Other types of data processing systems coupled to network 210 may also include software applications. Software applications could include a web browser, email, or other software application that can determine fuel economy for a vehicle by fuel source location.

Server 220, storage unit 230, client 240, laptop 250, mobile phone 260, vehicle 270 and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, vehicle 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3:
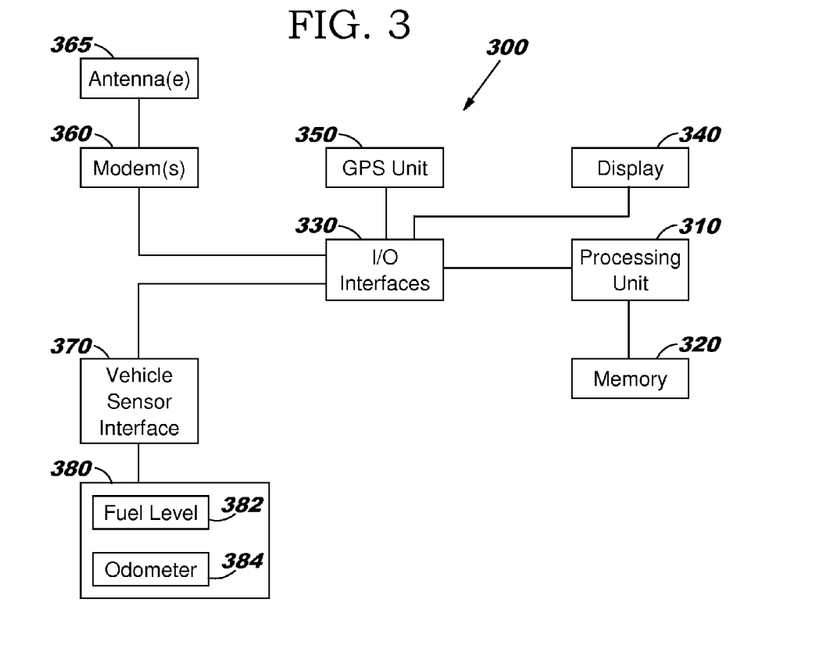
FIG. 3 is a block diagram of a system for determining fuel economy by fuel source location in accordance with a first embodiment.

FIG. 3 is a block diagram of a system for determining fuel economy by fuel source location in accordance with a first embodiment. A system 300 may be a mobile system such as an application on a mobile phone or an application on a portable GPS unit, or it may be added onto or integrated with an automobile, a motorcycle, a truck, a boat, an airplane, or any other vehicle which refuels at multiple locations. System 300 includes a processing unit 310 for implementing many of the processes described below. A memory 320 may be used to store and operating system and computer programs executed on processing unit 310. Memory 320 may also be used to program store data generated and utilized by internal or external computer programs.

A set of I/O interfaces 330 handles communications between the processing unit and some vehicle internal and external elements. I/O interface 330 may communicate with a user through a touch sensitive display 340 or other type of user interface. The processing unit may also communicate through the I/O interface with a GPS unit 350. The GPS unit may be embedded with the vehicle or it may be an add-on. Alternative embodiments may allow the user to enter location and other information when refueling through display 340. The I/O interface may also be used to communicate with other devices through a variety of modem(s) 360 with antenna(e) 365 such as a cellular tower, a router to an internet connection, or to various mobile devices such as a mobile phone or portable GPS unit.

I/O interface 330 may provide communications with a vehicle sensor interface 370 for data from various vehicle sensors 380. This may include communicating with a fuel level sensor 382 in the vehicle for determining when a vehicle is being refueled, how much fuel was in the vehicle before fueling, and how much fuel was added during refueling. This may also include an odometer 384 for ascertaining the mileage on the vehicle when it is being refueled for determining fuel economy in miles per gallon, liters per 100 kilometers, or other similar measurement. Alternative embodiments could allow the user to manually enter this information through display 340 or a mobile device such as a mobile phone.

Figure 4:
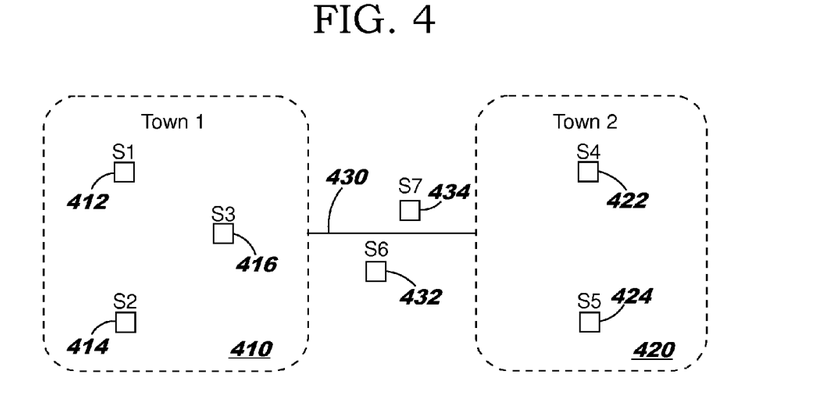
FIG. 4 is a diagram illustrating multiple fuel stations that a vehicle may use for refueling in which various embodiments may be implemented.

FIG. 4 is a diagram illustrating multiple fuel stations that a vehicle may use for refueling in which various embodiments may be implemented. In this example, there is a Town 1 410 with three refueling stations S1 412, S2 414, and S3 416, each refueling station located at a different location within Town 1. There is also a Town 2 420 with two refueling stations S4 422 and S5 424, each refueling station located at a different location within Town 2. Town 1 and Town 2 are interconnected by a highway 430 with refueling stations S6 432 and S7 434. In this example, a user may live in Town 1 and commute to work in Town 2 on highway 430. As a result, the user may easily refuel at any refueling station at either town or on the highway. This user would like to know which refueling station in each town, on the highway, and overall provides fuel with the best fuel economy.

Figure 5:
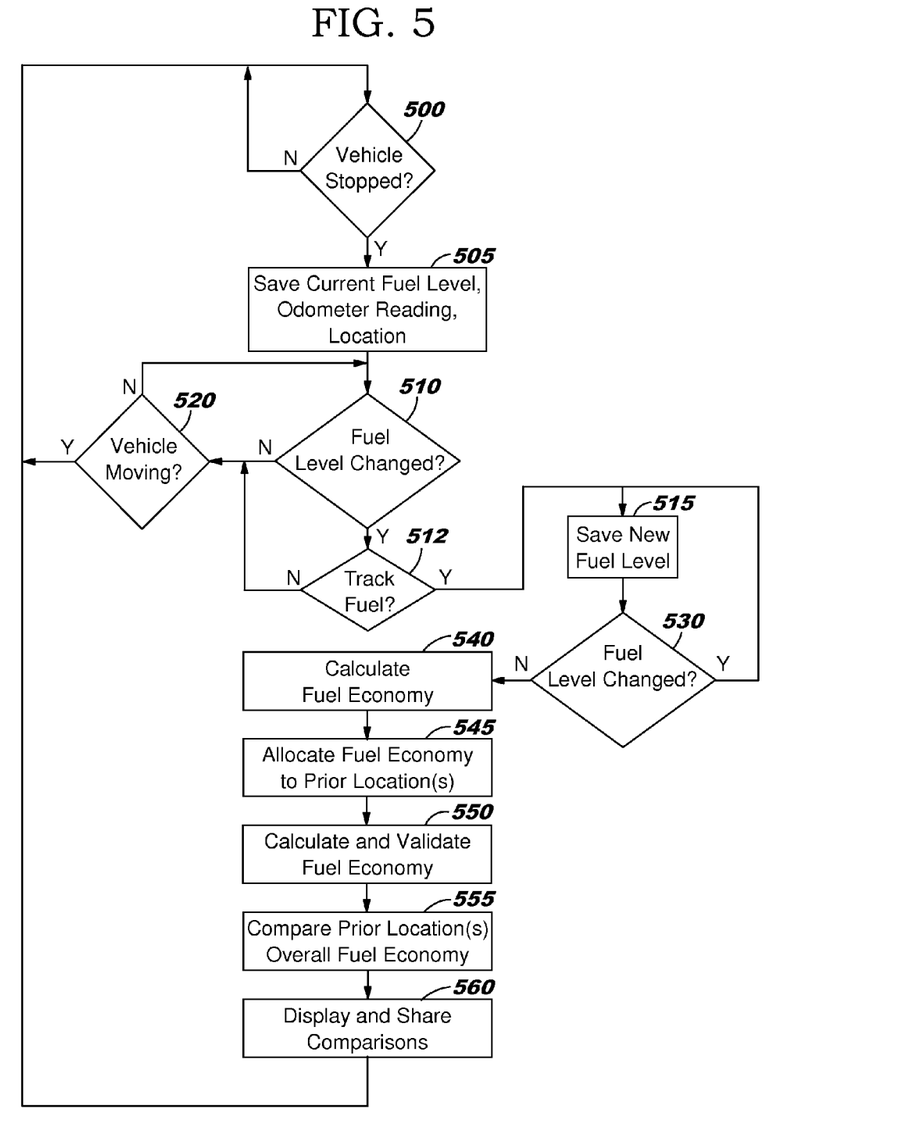
FIG. 5 is a flow diagram of the operation of a system for determining fuel economy by fuel source location in accordance with a first embodiment.

FIG. 5 is a flow diagram of the operation of a system for determining fuel economy by fuel source location in accordance with a first embodiment. In a first step 500 the system determines whether the vehicle has stopped. This may be determined by checking the odometer or GPS unit. It may also be checked with other sensors available in the vehicle. If not stopped, then processing returns to step 500 again which is repeated until the vehicle is stopped. The vehicle may stop for a variety of reasons including at a stop light, at a place of work or home, or at a shopping center. In any case, if the vehicle has stopped, the current fuel level, odometer reading and location is saved to memory in step 505. The location may be determined by a GPS unit or other types of location sensors utilizing electronic communications (e.g. near-field communications with a smart pump, laser reading of a patterned sticker on the pump, etc.). The location may also be entered by the user through a display.

Subsequent to step 505, the system determines after a period of time whether the fuel level has changed in step 510. If no in step 510, then processing continues to step 520 where the system determines if the vehicle is moving again. If yes in step 520, the processing returns to step 500 as the vehicle has not been refueled during this stop. If no in step 520, the processing returns to step 510. If yes in step 510, then refueling has started and processing continues to step 512. In step 512 it is determined whether the fuel tracking has been disabled by the user or driver. A query to the driver may be performed at each refueling to determine whether to proceed with fuel tracking. In the alternative, the driver or user may disable this tracking capability until chosen otherwise. If no in step 512, then processing continues to step 520. If yes in step 512, then refueling has started and the new fuel level is saved in step 515. Subsequent to step 515, in step 530 it is determined whether the fuel level has changed again after a period of time. If yes, then refueling is continuing and processing returns to step 515 above. If no in step 530, then refueling has ceased and processing continues to step 540. In an alternative embodiment, the system may communicate with a smart version of a fuel pump such as through near field communications to determine the exact amount of fuel received during refueling and other information such as location, fuel octane, price, etc. This information could then be utilized as described below.

The following steps 540 through 555 may be performed at any time including when the vehicle is moving or whenever requested by a user. In step 540, the fuel economy of the prior tank of fuel is calculated. The current fuel level is subtracted from a new fuel level saved at the prior refueling to determine the amount of fuel used since the last refueling. In addition, a current odometer reading from the prior refueling is subtracted from the current odometer reading of the current refueling to determine the distance traveled since the last refueling. The amount of fuel used and the distance traveled since the last refueling may be used to calculate the fuel economy. This may be in miles per gallon, liters per 100 kilometers, or any other type of measure preferred by the user. In alternative embodiments, the distance traveled may be determined by GPS readings during the times the vehicle was in motion.

Subsequently in step 545 the fuel economy is allocated to the prior location(s) where the vehicle was previously refueled and saved to a database. For example, if the previous refueling was performed when the fuel tank was nearly empty, then all fuel economy may be allocated to that prior location. However, if the fuel tank was not nearly empty, such as one quarter full, then part of the fuel economy may also be allocated to the location prior to the prior location. For example, if the tank holds 20 gallons, was filled up at fuel source A repeatedly, then all fuel mileage would be allocated to fuel source A. However, if the tank is one quarter full from fuel source A and the driver fills up at fuel source B, then 5 gallons in the tank are from fuel source A and 15 gallons are from fuel source B. If the driver then drives 400 miles until the tank is nearly empty, then the fuel economy was 20 miles per gallon overall. Of that, 5 gallons at 20 miles per gallon would be allocated to fuel source A and 15 gallons at 20 miles per gallon would be allocated to fuel source B. This would be combined with all other allocations of fuel for each location to determine an overall fuel economy for each location. Once the percentage of fuel in the vehicle tank is less than X % (e.g. 5% or other minor amount), then the fuel from that fuel source may be added to the fuel amounts from the other remaining fuel sources in the tank for simplification of calculations. In an alternative embodiment, only fuel from the previous one two fuel sources will be allocated. In another alternative embodiment, no fuel may be allocated to any fuel source when less than 80 or 90 percent of the fuel is from a single fuel source. Once allocated, then a database of locations and their fuel economies is updated with the allocated amounts. Processing then continues to step 550.

In step 550, the overall fuel economies of the prior refueling locations are calculated and validated. That is, the recent refueling numbers are accumulated and averaged with prior refueling numbers for that same location and the result is checked for statistical validity. That is, a rating or score of the statistical strength of the fuel economy numbers (raw and adjusted) is calculated and stored based on the number of refuelings, the number of drivers, and the number of other variables which could affect the precision of the calculated fuel economy. Subsequently in step 555, the fuel economies of the various fuel source locations with statistical validity are compared. For example, if the user has refueled at only the locations S1 and S2 in Town 1, then the fuel economies of those locations is compared and stored in a database of comparable fuel economies by location. Subsequently, the comparisons are displayed for the user in step 560 and/or uploaded to a remote server or other data processing system for sharing with others. In addition, the fuel economy calculations and validity of each calculation may be shown as well. This display of fuel economy information may be displayed at the time of the current refueling or at a later time such as when the user needs refueling and is determining which location to refuel. The user may select this information for display by general location such as for Town 1, Town 2, Highway, or for all locations. The comparisons may be shown in tabular form, on a map with colors such as red for poor fuel economy and green for good fuel economy, etc. If the user is using a GPS unit, such information could be displayed on the GPS unit such as through a wireless connection. Processing then returns to step 500.

In an alternative embodiment, the driver may be queried whether to track the fuel economy for the current location such as after step 560. At this point the fuel economy for the prior location has been allocated, calculated, and validated, but the driver may wish to ignore any fuel economy calculations for the current station. Upon a positive response from the drive indicating a desire to not track fuel economy for the current location, a flag may be saved indicating such. At the next refueling, the system could answer no to step 512 automatically based on the flag, thereby avoiding calculating fuel economy for the previous location as previously indicated by the driver.

Figure 6:
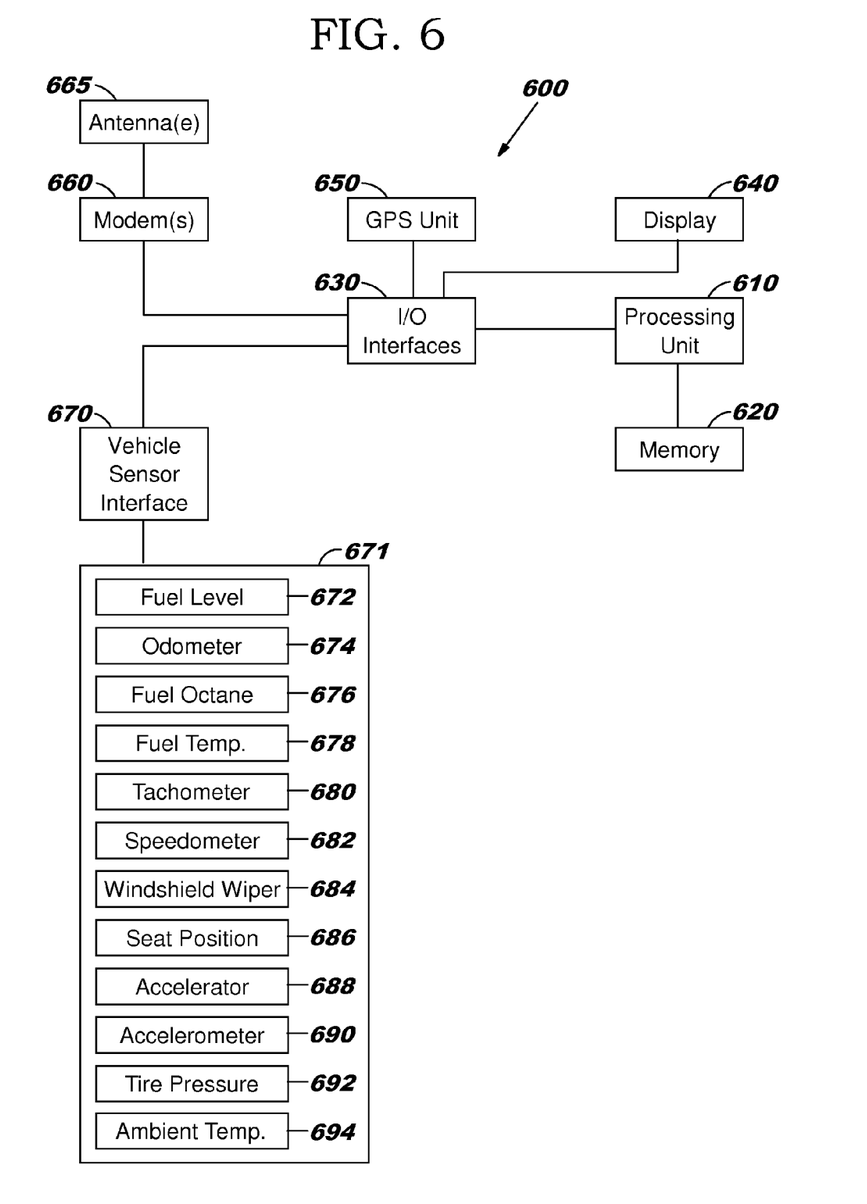
FIG. 6 is a block diagram of a system for determining fuel economy by fuel source location in accordance with a second embodiment.

FIG. 6 is a block diagram of a system for determining fuel economy by fuel source location in accordance with a second embodiment. A system 600 may be a mobile system such as an application on a mobile phone or an application on a portable GPS unit, or it may be added onto or integrated with an automobile, a motorcycle, a truck, a boat, an airplane, or any other vehicle which refuels at multiple locations. System 600 includes a processing unit 610 for implementing many of the processes described below. A memory 620 may be used to store and operating system and computer programs executed on processing unit 610. Memory 620 may also be used to program store data generated and utilized by internal or external computer programs.

A set of I/O interfaces 630 handles communications between the processing unit and some vehicle internal and external elements. I/O interface 630 may communicate with a user through a touch sensitive display 640 or other type of user interface. The processing unit may also communicate through the I/O interface with a GPS unit 650. The GPS unit may be embedded with the vehicle or it may be an add-on. Alternative embodiments may allow the user to enter location and other information when refueling through display 640. The I/O interface may also be used to communicate with other devices through a variety of modem(s) 660 with antenna(e) 665 such as a cellular tower, a router to an internet connection, or to various mobile devices such as a mobile phone or portable GPS unit.

I/O interface 630 may also provide communications with a vehicle sensor interface 670 for data from various vehicle sensors 671. The information obtained from these sensors can better automate the system processes, allow for more flexibility, and provide a better analysis of fuel economy. A fuel level sensor 672 is used for determining when a vehicle is being refueled, how much fuel was in the vehicle before fueling, and how much fuel was added during refueling. Also included is an odometer 674 for ascertaining the mileage on the vehicle when it is being refueled for determining fuel economy in miles per gallon, liters per 100 kilometers, or other similar measurement. Alternative embodiments could allow the user to manually enter this information through display 640 or a mobile device such as a mobile phone. A fuel octane sensor 676 can be used to determine what type of fuel is being pumped, which can be important if the driver may choose different types of fuel from the same location over time. A fuel temperature sensor 678 can be used to adjust fuel economy calculations. A tachometer sensor 680 can be used to adjust fuel economy calculations based on whether a driver is driving aggressively or not on different types of fuel. A speedometer sensor 682 can be used to adjust fuel economy calculations based on whether a driver is driving aggressively or if the vehicle is on the highway or in the city.

A windshield wiper sensor 684 can help determine whether the vehicle is in rainy conditions, which could affect fuel economy. A seat position sensor 686 can be used to determine whether there are multiple drivers of the vehicle and which driver is driving at a given time. Accelerator sensor 688 and accelerometer sensor 690 may be used to determine driver aggressiveness and thereby make adjustments to fuel economy calculations. They may also be used to determine an approximate weight of the vehicle. That is, if the vehicle accelerates more slowly than previously in response to the driver pressing down hard on the accelerator, the vehicle may be temporarily heavier form passengers or cargo. Tire pressure sensors 692 may be used to determine tire pressure, which can easily affect fuel economy. An ambient temperature sensor 694 may also be used as ambient temperature can also affect fuel economy. Please note that ambient temperature and fuel temperature may often be the same, but they may also be different as fuel warms and cools more slowly than ambient temperatures.

Figure 7:
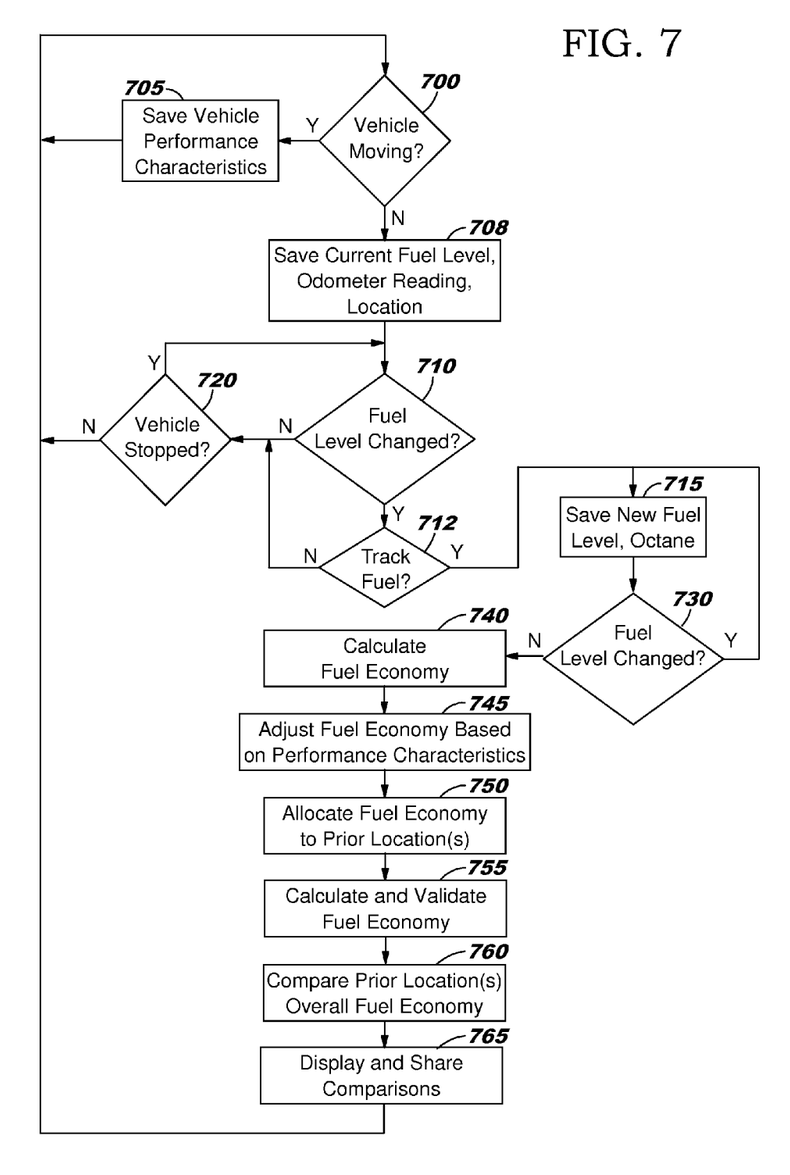
FIG. 7 is a flow diagram of the operation of a system for determining fuel economy by fuel source location in accordance with a second embodiment.

FIG. 7 is a flow diagram of the operation of a system for determining fuel economy by fuel source location in accordance with a second embodiment. In a first step 700 the system determines whether the vehicle is moving. This may be determined by checking the odometer or GPS unit. It may also be checked with other sensors available in the vehicle. If moving, then in step 705 a variety of performance characteristics are saved to a database. The characteristics can include information from many of the sensors shown in FIG. 6. For example, acceleration and deceleration may be determined from an accelerometer, weather conditions may be implied from the windshield wiper, speed and whether the vehicle is on a highway may be determined from a speedometer, whether a new driver is driving the vehicle may be implied from the seat position, etc. Processing then returns to step 500 again which is repeated until the vehicle is stopped. The vehicle may stop for a variety of reasons including at a stop light, at a place of work or home, or at a shopping center. In any case, if the vehicle has stopped moving in step 700, then the current fuel level, odometer reading and location is saved to memory in step 708. The location may be determined by a GPS unit or other types of location sensors utilizing electronic communications (e.g. near-field communications with a smart pump, laser reading of a patterned sticker on the pump, etc.). The location may also be entered by the user through a display.

Subsequent to step 708, the system determines after a period of time whether the fuel level has changed in step 710. If no in step 710, then processing continues to step 720 where the system determines if the vehicle is still stopped. If no in step 720, the processing returns to step 700 as the vehicle has not been refueled during this stop. If yes in step 720, the processing returns to step 710. If yes in step 710, then refueling has started and processing continues to step 712. In step 712 it is determined whether the fuel tracking has been disabled by the user or driver. A query to the driver may be performed at each refueling to determine whether to proceed with fuel tracking. In the alternative, the driver or user may disable this tracking capability until chosen otherwise. If no in step 712, then processing continues to step 720. If yes in step 712, then refueling has started and the new fuel level and the octane of the fuel being pumped (from an octane sensor) are saved in step 715. Subsequent to step 715, in step 730 it is determined whether the fuel level has changed again after a period of time. If yes, then refueling is continuing and processing returns to step 715 above. If no in step 730, then refueling has ceased and processing continues to step 740. In an alternative embodiment, the system may communicate with a smart version of a fuel pump electronically such as through near field communications to determine the exact amount of fuel received during refueling and other information such as location, fuel octane, price, etc. This information could then be utilized as described below.

The following steps 740 through 760 may be performed at any time including when the vehicle is moving or whenever requested by a user. In step 740, the fuel economy of the prior tank of fuel is calculated. The current fuel level is subtracted from a new fuel level saved at the prior refueling to determine the amount of fuel used since the last refueling. In addition, a current odometer reading from the prior refueling is subtracted from the current odometer reading of the current refueling to determine the distance traveled since the last refueling. The amount of fuel used and the distance traveled since the last refueling may be used to calculate the fuel economy. This may be in miles per gallon, liters per 100 kilometers, or any other type of measure preferred by the user. In alternative embodiments, the distance traveled may be determined by GPS readings during the times the vehicle was in motion.

Subsequently in step 745 the fuel economy is adjusted according to performance characteristics of the vehicle since the last refueling. For example, if the vehicle has undergone more acceleration and deceleration since the last refueling, then the vehicle may be experiencing more city driving than normal, and the fuel economy may be raised to compensate. In another example, if the tire pressure is lower than normal, the fuel economy may be raised to compensate. This compensation is to allow a more fair comparison of fuel economies between fuel source locations.

Thereafter in step 750 the fuel economy is allocated to the prior location(s) where the vehicle was refueled and saved to a database. For example, if the previous refueling was performed when the fuel tank was nearly empty, then all fuel economy may be allocated to that prior location. However, if the fuel tank was not nearly empty, such as one quarter full, then part of the fuel economy may also be allocated to the location prior to the prior location. For example, if the tank holds 20 gallons, was filled up at fuel source A repeatedly, then all fuel mileage would be allocated to fuel source A. However, if the tank is one quarter full from fuel source A and the driver fills up at fuel source B, then 5 gallons in the tank are from fuel source A and 15 gallons are from fuel source B. If the driver then drives 400 miles until the tank is nearly empty, then the fuel economy was 20 miles per gallon overall. Of that, 5 gallons at 20 miles per gallon would be allocated to fuel source A and 15 gallons at 20 miles per gallon would be allocated to fuel source B. This would be combined with all other allocations of fuel for each location to determine an overall fuel economy for each location. Once the percentage of fuel in the vehicle tank is less than X % (e.g. 5% or other minor amount), then the fuel from that fuel source may be added to the fuel amounts from the other remaining fuel sources in the tank for simplification of calculations. In an alternative embodiment, only fuel from the previous one two fuel sources will be allocated. In another alternative embodiment, no fuel may be allocated to any fuel source when less than 80 or 90 percent of the fuel is from a single fuel source. The driver may also be given the option whether to store data for a given refueling. This allows the driver to refuse storing data for a fuel source location that the driver does not expect to visit again. Once allocated, then a database of locations and their fuel economies is updated with the allocated amounts. Processing then continues to step 755.

In step 755, the overall fuel economies of the prior refueling locations are calculated and validated. That is, the recent refueling numbers are accumulated and averaged with prior refueling numbers for that same location and the result is checked for statistical validity. That is, a rating or score of the statistical strength of the fuel economy numbers (raw and adjusted) is calculated and stored based on the number of refuelings, the number of drivers, and the number of other variables which could affect the precision of the calculated fuel economy. Subsequently in step 760, the fuel economies of the various fuel source locations with statistical validity are compared. For example, if the user has refueled at only the locations S4 and S5 in Town 2, then the fuel economies of those locations is compared and stored in a database of comparable fuel economies by location. Subsequently, the comparisons are displayed for the user in step 765 and/or uploaded to a remote server or other data processing system for sharing with others. In addition, the fuel economy calculations and validity of each calculation may be shown as well. This display of fuel economy information may be displayed at the time of the current refueling or at a later time such as when the user needs refueling and is determining which location to refuel. The user may select this information for display by general location such as for Town 1, Town 2, Highway, or for all locations. The comparisons may be shown in tabular form, on a map with colors such as red for poor fuel economy and green for good fuel economy, etc. If the user is using a GPS unit, such information could be displayed on the GPS unit such as through a wireless connection. Processing then returns to step 500.

In an alternative embodiment, the driver may be queried whether to track the fuel economy for the current location such as after step 765. At this point the fuel economy for the prior location has been allocated, calculated, and validated, but the driver may wish to ignore any fuel economy calculations for the current station. Upon a positive response from the drive indicating a desire to not track fuel economy for the current location, a flag may be saved indicating such. At the next refueling, the system could answer no to step 712 automatically based on the flag, thereby avoiding calculating fuel economy for the previous location as previously indicated by the driver.

Figure 8A:
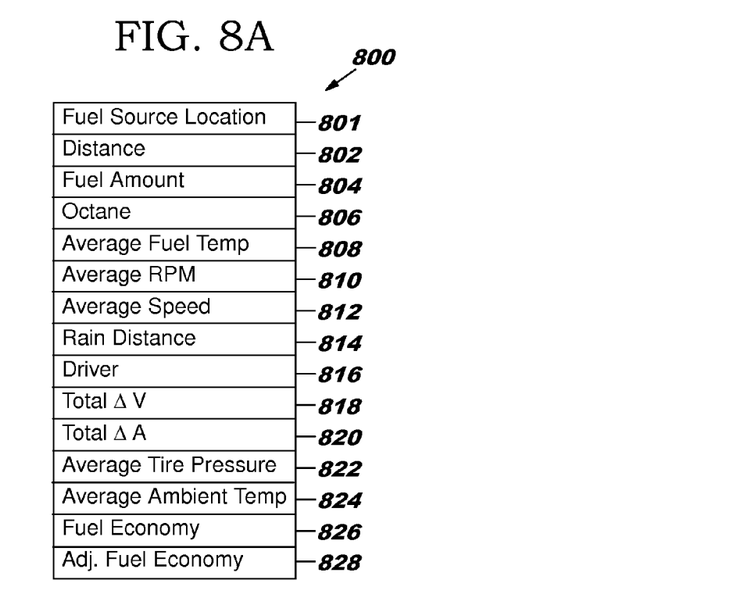
FIGS. 8A and 8B are diagrams of data structures utilized to store accumulated data regarding fuel economy in which various embodiments may be implemented.
Figure 8B:
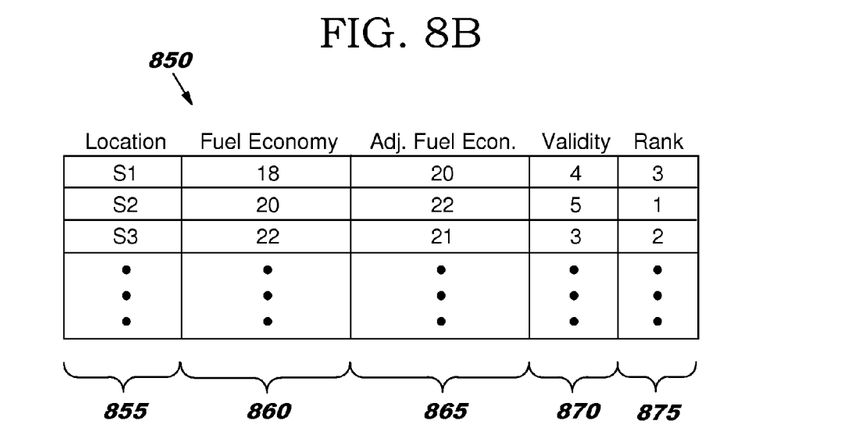

FIGS. 8A and 8B are diagrams of data structures utilized to store accumulated data regarding fuel economy in which various embodiments may be implemented. Many other alternative data structures may be utilized based on the type of information gathered, the method of analyzing that data, and the sharing of that information with the user or others.

FIG. 8A is a single data record 800 for the fuel used from a single source location from a single refueling. For example, if a driver stops to refuel and the fuel used since the last refueling was from two fuel sources, then two data records would be generated. Given that a typical vehicle may be refueled less than 1000 times during its life, saving this level of detail would not use a significant amount of memory and would allow adjustments based on statistical analysis in the future. However, alternative embodiments may not save records from individual refueling in order to reduce the amount of data stored in memory. Such alternatives would save accumulated totals for each location such as shown in FIG. 8B.

Each record 800 may contain a variety of data depending on the data available to be captured and used in calculating fuel economy and adjusted fuel economy. This embodiment includes fuel source location 801, distance 802, fuel 804, octane 806, average fuel temperature while driving 808, average RPM (revolutions per minute) 810, average speed 812, distance traveled in rain 814, driver 816, total change in velocity 816, average change in acceleration 820, average tire pressure while driving 822, average ambient temperature while driving 824, fuel economy 826 and adjusted fuel economy 828. Most of this data is easily captured by taking readings at the time of the previous refueling and the current refueling such as distance and fuel. Other data may be accumulated over time such as average fuel temperature, average RPM, average speed, etc. Some data helps identify whether the vehicle was traveling on a highway or in the city such as average speed and total change in velocity. Other data helps identify driver behavior such as average change in acceleration. Some of the data (e.g. fuel economy and adjusted fuel economy) is calculated from the other data and then used for total accumulations for a fuel source location.

FIG. 8B is a data structure 850 containing an accumulation of the data from FIG. 8A above by fuel source location 855. For each fuel source location is an average fuel economy 860, an adjusted fuel economy 865, a statistical validity 870 and a ranking 875. FIG. 8B shows three locations S1, S2 and S3. Additional locations may easily be added as the vehicle is refueled at more locations. A fuel economy for each location may be calculated based on a weighted average fuel economy derived from each refueling at that location. For example, if there were two refuelings at location S1 where the first refueling was for 10 gallons of fuel and the second refueling for 15 gallons of fuel, then the fuel economy of the second refueling would be more heavily weighted. The weighted average may also be modified based on timing where the more recent refueling would be more heavily weighted as fuel as the data is more recent. The adjusted fuel economy for that location may be similarly calculated. The statistical validity or reliability of the fuel economy calculations is also provided. In this example, the ranking is similar to a five star system with five being the best ranking. Any rankings less than a certain amount (e.g. three) may be ignored when comparing, displaying or sharing fuel economy information. A cross comparison of each fuel source location is calculated and stored. Other types of comparisons may be performed.

In alternative embodiments, additional columns of data may be accumulated or captured such as fuel octane, driver, fuel cost, etc. For example, if the driver uses more than one type of fuel from a fuel location (e.g. regular and super), then fuel octane may be captured at each refueling (see fuel octane 676 of FIG. 6). That information could be used to provide different fuel economy calculations for each type of fuel at the same location, resulting in two or more rows of data in FIG. 8B. Similarly, if more than one driver drives the vehicle, then driver information may be captured at each refueling (see seat position 686 of FIG. 6). That information could be used to provide different fuel economy calculations for each driver at each location they both use, resulting in two or more rows of data for each location used by both drivers in FIG. 8B. With regards to cost, the vehicle may be able to periodically download up to date cost information for each location (and octane type). That up to date information may be used to calculate a cost per fuel amount or cost per distance traveled or other measurements, which can be added as additional columns of information in FIG. 8B. If such information is accumulated and captured, then the driver could readily access that information for making refueling decisions. In addition, in combination with a GPS unit, the driver could be directed to the closest fuel location with the best price per distance driven. The current location of the vehicle, the current cost per distance driven, the current amount of fuel in the vehicle, and the distance to each fuel location could also be utilized to determine the most cost effective fuel location for refueling for the driver.

Fuel economy information from multiple vehicles may be collected and shared. That is, each vehicle may upload its fuel economy information by location to a remote server. The remote server may then accumulate such information from multiple vehicles and then share that information when queried. For example, a user may be able to view a map of an area, similar to that shown in FIG. 4, where those fuel sources with the best fuel economy are shown in green and those with the worst fuel economy shown in red. Alternatively, a star rating system may be used on such a map (i.e. 5 stars being the best fuel economy). Alternative embodiments may accumulate and share such information in a variety of ways as can be appreciated by one skilled in the art.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as software for determining fuel economy for a vehicle by fuel source location. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of computing fuel economy for a vehicle by fuel source location comprising:
   responsive to receiving signals from a fuel level sensor, monitoring a fuel level for the vehicle;
   responsive to determining a first increase of the fuel level at a first fuel source location, computing a first fuel economy based on the first increase of the fuel level and a first distance travelled by the vehicle since a previous fuel source location; and allocating the first fuel economy to the previous fuel source location in a database.

2. The method of claim 1 further comprising:

responsive to determining a second increase of the fuel level at a second fuel source location, computing a second fuel economy based on the second increase of the fuel level and a second distance travelled since the first fuel source location; and allocating the second fuel economy to the first fuel source location in the database.

3. The method of claim 2 wherein responsive to determining a first increase of the fuel level at a first fuel source location determining the first location by electronic communications, and wherein the second fuel economy is allocated to the first fuel source location and the previous fuel source location based on a difference between the first increase fuel level and a fuel capacity of the vehicle.

4. The method of claim 1 further comprising displaying the first fuel economy on a map and displaying the second fuel economy on the map.

5. The method of claim 4 wherein the database is uploaded to a centralized database and the map is displayed to other persons.

6. The method of claim 1 further comprising:

responsive to determining a second increase of the fuel level at the first fuel source location, computing a second fuel economy based on the second increase of the fuel level and a second distance travelled since the first refueling at the first fuel source location;

allocating the second fuel economy to the first fuel source location;

responsive to determining a third increase of the fuel level at the first fuel source location, computing a third fuel economy based on the third increase of the fuel level and a third distance traveled since the second refueling at the first fuel source location;

computing an average of the second fuel economy and the third fuel economy and associating the average to the first fuel source location in the database.

7. The method of claim 1 wherein a user is queried whether to compute and allocate a first fuel economy, and responsive to a negative response from the user, disabling the steps of computing and allocating the first fuel economy.

8. The method of claim 2 further comprising:

computing a first statistical validity score for the first fuel economy;

computing a second statistical validity score for the second fuel economy; and storing the first and second validity scores in the database.

9. A computer usable program product comprising a non-transitory computer usable storage medium including computer usable code for use in computing fuel economy for a vehicle by fuel source location, the computer usable program product comprising code for performing the steps of:

responsive to receiving signals from a fuel level sensor, monitoring a fuel level for the vehicle;

responsive to determining a first increase of the fuel level at a first fuel source location, computing a first fuel economy based on the first increase of the fuel level and a first distance travelled by the vehicle since a previous fuel source location; and allocating the first fuel economy to the previous fuel source location in a database.

10. The computer usable program product of claim 9 further comprising code for performing the steps of:

responsive to determining a second increase of the fuel level at a second fuel source location, computing a second fuel economy based on the second increase of the fuel level and a second distance travelled since the first fuel source location; and allocating the second fuel economy to the first fuel source location in the database.

11. The computer usable program product of claim 10 wherein responsive to determining a first increase of the fuel level at a first fuel source location determining the first location by electronic communications, and wherein the second fuel economy is allocated to the first fuel source location and the previous fuel source location based on a difference between the first increase fuel level and a fuel capacity of the vehicle.

12. The computer usable program product of claim 9 further comprising code for performing the steps of displaying the first fuel economy on a map and displaying the second fuel economy on the map.

13. The computer usable program product of claim 12 wherein the database is uploaded to a centralized database and the map is displayed to other persons.

14. The computer usable program product of claim 9 further comprising code for performing the steps of:

responsive to determining a second increase of the fuel level at the first fuel source location, computing a second fuel economy based on the second increase of the fuel level and a second distance travelled since the first refueling at the first fuel source location;

allocating the second fuel economy to the first fuel source location;

responsive to determining a third increase of the fuel level at the first fuel source location, computing a third fuel economy based on the third increase of the fuel level and a third distance traveled since the second refueling at the first fuel source location;

computing an average of the second fuel economy and the third fuel economy and associating the average to the first fuel source location in the database.

15. A data processing system for computing fuel economy for a vehicle by fuel source location, the data processing system comprising:

a processor; and a memory storing program instructions which when executed by the processor execute the steps of:

responsive to receiving signals from a fuel level sensor, monitoring a fuel level for the vehicle;

responsive to determining a first increase of the fuel level at a first fuel source location, computing a first fuel economy based on the first increase of the fuel level and a first distance travelled by the vehicle since a previous fuel source location; and allocating the first fuel economy to the previous fuel source location in a database.

16. The data processing system of claim 15 further comprising the steps of:

responsive to determining a second increase of the fuel level at a second fuel source location, computing a second fuel economy based on the second increase of the fuel level and a second distance travelled since the first fuel source location; and allocating the second fuel economy to the first fuel source location in the database.

17. The data processing system of claim 16 wherein responsive to determining a first increase of the fuel level at a first fuel source location determining the first location by electronic communications, and wherein the second fuel economy is allocated to the first fuel source location and the previous fuel source location based on a difference between the first increase fuel level and a fuel capacity of the vehicle.

18. The data processing system of claim 15 further comprising the steps of displaying the first fuel economy on a map and displaying the second fuel economy on the map.

19. The data processing system of claim 18 wherein the database is uploaded to a centralized database and the map is displayed to other persons.

20. The data processing system of claim 15 further comprising the steps of:
responsive to determining a second increase of the fuel level at the first fuel source location, computing a second fuel economy based on the second increase of the fuel level and a second distance travelled since the first refueling at the first fuel source location;
allocating the second fuel economy to the first fuel source location;
responsive to determining a third increase of the fuel level at the first fuel source location, computing a third fuel economy based on the third increase of the fuel level and a third distance traveled since the second refueling at the first fuel source location;
computing an average of the second fuel economy and the third fuel economy and associating the average to the first fuel source location in the database.

* * * * *